(12) United States Patent
Yao et al.

(10) Patent No.: US 12,065,547 B2
(45) Date of Patent: *Aug. 20, 2024

(54) CELLULOSIC PARTICLE

(71) Applicant: FUJIFILM Business Innovation Corp., Tokyo (JP)

(72) Inventors: Kenji Yao, Kanagawa (JP); Hideaki Yoshikawa, Kanagawa (JP); Masahiro Oki, Kanagawa (JP); Kazusei Yoshida, Kanagawa (JP); Ayu Naito, Kanagawa (JP); Yuko Iwadate, Kanagawa (JP); Takahiro Ishizuka, Kanagawa (JP); Tetsuya Taguchi, Kanagawa (JP); Hirokazu Hamano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,467

(22) Filed: Oct. 26, 2022

(65) Prior Publication Data

US 2023/0250241 A1    Aug. 10, 2023

(30) Foreign Application Priority Data

Feb. 8, 2022 (JP) .............................. JP2022-017986

(51) Int. Cl.
*C08J 3/12* (2006.01)

(52) U.S. Cl.
CPC ............... *C08J 3/128* (2013.01); *C08J 3/126* (2013.01); *C08J 2301/12* (2013.01)

(58) Field of Classification Search
CPC ... C08J 3/126–128; C08J 2301/12; C08L 1/02
See application file for complete search history.

(56) References Cited

U.S. PATENT DOCUMENTS

| 2021/0032372 A1 | 2/2021 | Iwasa et al. |
| 2021/0032415 A1 | 2/2021 | Yoshimura et al. |

FOREIGN PATENT DOCUMENTS

| JP | 2020132616 | 8/2020 | |
| JP | 2021021044 | 2/2021 | |
| JP | 2021021045 | 2/2021 | |
| JP | 6921293 | 8/2021 | |
| JP | 6921923 | 8/2021 | |
| WO | WO-2013166385 A1 * | 11/2013 | ............. A61K 31/12 |

* cited by examiner

*Primary Examiner* — Alexandre F Ferre
(74) *Attorney, Agent, or Firm* — JCIPRNET

(57) ABSTRACT

A cellulosic particle includes: a cellulose-based core particle; a first coating layer covering the core particle and containing a polyamine compound; and a second coating layer covering the first coating layer and containing at least one selected from the group consisting of a wax, a linear-chain saturated fatty acid, a hydroxy fatty acid, and an amino acid compound.

14 Claims, No Drawings

CELLULOSIC PARTICLE

CROSS-REFERENCE TO RELATED APPLICATIONS

This application is based on and claims priority under 35 USC 119 from Japanese Patent Application No. 2022-017986 filed Feb. 8, 2022.

BACKGROUND

(i) Technical Field

The present disclosure relates to a cellulosic particle.

(ii) Related Art

In Japanese Patent No. 6921293, "resin beads obtained by surface treatment of core beads formed from a resin having cellulose as a main component by a solid surface treatment agent, in which the volume-based cumulative 50% particle size is 50 μm or less, the sphericity is 0.7-1.0, the surface smoothness is 70-100%, and the degree of crystallization is 60% or less" are proposed.

In Japanese Unexamined Patent Application Publication No. 2020-132616, "oily solid cosmetics containing surface-treated spherical cellulose powder with an average particle size of 1.0-30.0 μm." are proposed.

SUMMARY

Aspects of non-limiting embodiments of the present disclosure relate to a cellulosic particle that may combine high biodegradability with high flexibility compared with cellulosic particles that are cellulose-based single-layer particles.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a cellulosic particle including: a cellulose-based core particle; a first coating layer covering the core particle and containing a polyamine compound; and a second coating layer covering the first coating layer and containing at least one selected from the group consisting of a wax, a linear-chain saturated fatty acid, a hydroxy fatty acid, and an amino acid compound.

DETAILED DESCRIPTION

Exemplary embodiments of the present disclosure will now be described. The following description and the Examples are for illustrating exemplary embodiments and do not limit the scope of aspects of the present disclosure.

In a series of numerical ranges presented herein, the upper or lower limit of a numerical range may be substituted with that of another in the same series. The upper or lower limit of a numerical range, furthermore, may be substituted with a value indicated in the Examples section.

A constituent may be a combination of multiple substances.

If a composition contains a combination of multiple substances as one of its constituents, the amount of the constituent represents the total amount of the substances in the composition unless stated otherwise.

Cellulosic Particles

Cellulosic particles according to an exemplary embodiment each include a cellulose-based core particle; a first coating layer covering the core particle and containing a polyamine compound; and a second coating layer covering the first coating layer and containing at least one selected from the group consisting of a wax, a linear-chain saturated fatty acid, a hydroxy fatty acid, and an amino acid compound.

Configured as described above, the cellulosic particles according to this exemplary embodiment may combine high biodegradability with high flexibility. A possible reason is as follows.

Due to the issue of marine debris, there is a need for biodegradable resin particles. In particular, cellulose-based particles, or cellulosic particles, have been used in various practical applications, such as cosmetics, by virtue of their rapid biodegradation in all of compost, activated sludge, and seawater environments.

Known cellulosic particles, however, are hard and inflexible, although admittedly highly biodegradable.

Coating cellulose-based core particles with a first coating layer containing a polyamine compound may help make the particles highly flexible compared with single-layer cellulosic particles.

Polyamine compounds, however, are of low biodegradability; coating with one or more of them will affect the biodegradability of the cellulosic particles. TO address this, the first coating layer is covered with a second coating layer containing at least one selected from the group consisting of a wax, a linear-chain saturated fatty acid, a hydroxy fatty acid, and an amino acid compound. Since waxes, linear-chain saturated fatty acids, hydroxy fatty acids, and amino acid compounds are biodegradable, this may help keep the particles rapidly biodegradable; when the wax starts to be biodegraded, it may peel off the first coating layer, to which the wax sticks firmly.

The wax, linear-chain saturated fatty acid, hydroxy fatty acid, and/or amino acid compound, furthermore, self-aggregate, and their hydrocarbons repel each other; the first coating layer, therefore, is not covered completely but exposed, and this may help keep the particles flexible.

For this reason, presumably, the cellulosic particles according to this exemplary embodiment, configured as described above, may combine high biodegradability with high flexibility.

Specifically, the cellulosic particles according to this exemplary embodiment may feel good when touched, e.g., it may feel soft, smooth, and velvety, by virtue of their high flexibility.

The details of the cellulosic particles according to this exemplary embodiment will now be described.

Core Particle

The core particle is a cellulose-based particle.

In this context, the term cellulose-based means the cellulose content of the core particle is 90% by mass or more.

The number-average molecular weight of the cellulose may be 37000 or more, preferably 45000 or more.

There is no particular upper limit to the number-average molecular weight of the cellulose, but for example, the number-average molecular weight may be 100000 or less.

Making the number-average molecular weight of the cellulose 37000 or more may make it more likely that the cellulosic particles combine high biodegradability with high flexibility. A possible reason is as follows.

If the number-average molecular weight is less than 37000, the number and strength of intramolecular and intermolecular hydrogen bonds increase due to an increased number of hydroxyl groups per unit volume as a result of an increase in terminal hydroxyl groups; the powder, therefore, tends to be harder and less flexible.

For this reason, presumably, it may be more likely that the cellulosic particles combine high biodegradability with high flexibility.

The number-average molecular weight of the cellulose is measured by gel permeation chromatography (differential refractometer, Optilab T-rEX, Wyatt Technology; multiangle light scattering detector, DAWN HELEOS II, Wyatt Technology; columns, one TSKgel α-M and one α-3000, Tosoh) with dimethylacetamide eluent (containing 0.1 M lithium chloride).

The core particle may contain extra constituents.

Examples of extra constituents include plasticizers, flame retardants, compatibilizers, release agents, light stabilizers, weathering agents, coloring agents, pigments, modifiers, anti-dripping agents, antistatic agents, anti-hydrolysis agents, fillers, reinforcing agents (glass fiber, carbon fiber, talc, clay, mica, glass flakes, milled glass, glass beads, crystalline silica, alumina, silicon nitride, aluminum nitride, boron nitride, etc.), acid acceptors for preventing acetic acid release (oxides, such as magnesium oxide and aluminum oxide; metal hydroxides, such as magnesium hydroxide, calcium hydroxide, aluminum hydroxide, and hydrotalcite; calcium carbonate; talc; etc.), and reactive trapping agents (e.g., epoxy compounds, acid anhydride compounds, carbodiimides, etc.).

The amount of each extra constituent may be 0% by mass or more and 5% by mass or less of the core particle as a whole. In this context, "0% by mass" means the core particle is free of that extra constituent.

Coating Layers

The coating layers include a first coating layer and a second coating layer.

First Coating Layer

The first coating layer contains a polyamine compound.

"Polyamine compound" is a generic term for aliphatic hydrocarbons having two or more primary amino groups.

Examples of polyamine compounds include a polyalkyleneimine, polyallylamine, polyvinylamine, and polylysine.

For improved biodegradability, the polyalkyleneimine may be a polyalkyleneimine including a repeat unit having a C1 to C6 (preferably C1 to C4, more preferably C1 or C2) alkylene group, preferably polyethyleneimine.

Examples of polyallylamines include homopolymers or copolymers of allylamine, allylamine amidosulfate, diallylamine, dimethylallylamine, etc.

Examples of polyvinylamines include products of alkali hydrolysis of poly (N-vinylformamide); a specific example is Mitsubishi Chemical's "PVAM-0595B."

The polylysine may be an extract from a natural source, may be a substance produced by a transformed microorganism, or may be a product of chemical synthesis.

The polyamine compound may be at least one selected from the group consisting of polyethyleneimine and polylysine.

Using at least one selected from the group consisting of polyethyleneimine and polylysine as polyamine compound (s) may make it more likely that the cellulosic particles combine high biodegradability with high flexibility. A possible reason is as follows.

Polyethyleneimine and polylysine are able to adhere firmly to the cellulosic particles by virtue of their high cation density and functional groups that react with the hydroxyl groups in the cellulose. Their hydrocarbon chain, at the same time, takes up an appropriate relative area, so if they adhere to the surface of the cellulosic particles, the hydrocarbon chains tend to repel each other and become exposed on the surface with spaces therebetween. The adequate quantity of spaces may increase the flexibility of the particle surface, and therefore the flexibility of the particles, with a sponge-like effect. These spaces, furthermore, may allow microorganisms to enter through; the superior biodegradability of the cellulose, therefore, may be reflected in the biodegradability of the particles.

For this reason, presumably, it may be more likely that the cellulosic particles combine high biodegradability with high flexibility.

The polyamine compound content may be 0.2% by mass or more or 2% by mass or less of the cellulosic particles as a whole.

The polyamine compound content relative to the entire first coating layer may be 90% by mass or more and 100% by mass or less, preferably 95% by mass or more and 100% by mass or less.

Second Coating Layer

The second coating layer contains at least one selected from a wax, a linear-chain saturated fatty acid, a hydroxy fatty acid, and an amino acid compound.

Wax

Examples of waxes include fatty acid-containing vegetable oils, hydrocarbon waxes, and diesters.

Examples of fatty acid-containing vegetable oils include castor oil, paulownia oil, linseed oil, shortening, corn oil, soybean oil, sesame oil, rapeseed oil, sunflower oil, rice bran oil, camellia oil, coconut oil, palm oil, walnut oil, olive oil, peanut oil, almond oil, jojoba oil, cocoa butter, shea butter, neem oil, safflower oil, Japan wax, candelilla wax, rice bran wax, carnauba wax, and Rosa damascena flower wax.

Examples of hydrocarbon waxes include petroleum waxes (paraffin wax, microcrystalline wax, petrolatum wax, etc.) and synthetic hydrocarbon waxes (polyethylene wax, polypropylene wax, polybutene wax, Fischer-Tropsch wax, etc.).

Examples of diesters include diesters of dibasic acids, such as malic acid, glutaric acid, adipic acid, azelaic acid, sebacic acid, and dodecanedioic acid, and C10 to C25 alcohols.

The wax may be carnauba wax.

Using carnauba wax as a wax may make it more likely that the cellulosic particles combine high biodegradability with high flexibility. A possible reason is as follows.

Carnauba wax contains constituents very apt to self-aggregate like free fatty acids and highly repulsive constituents like hydrocarbons; multiple self-aggregates repel each other and cover the surface like islands, and a continuous exposed structure is present like a sea. If the island portion has some thickness, the flexibility of the surface of the particles may increase by virtue of the flexibility of this portion, and a relatively uniform distribution of these islands may increase the overall flexibility of the particles. Microorganisms, furthermore, can penetrate into the spaces between the islands, or the sea portion; using carnauba wax, therefore, may help achieve superior biodegradability.

For this reason, presumably, it may be more likely that the cellulosic particles combine high biodegradability with high flexibility.

Linear-Chain Saturated Fatty Acid

Linear-chain saturated fatty acids are saturated fatty acids in a linear-chain structure.

For improved biodegradability and improved flexibility, the linear-chain saturated fatty acid may be a linear-chain saturated fatty acid with 14 or more and 22 or fewer carbon atoms (C14 to C22).

Specific examples of C14 to C22 linear-chain saturated fatty acids include behenic acid, arachidic acid, and palmitic acid.

The reason why using a linear-chain saturated fatty acid in the second coating layer may help increase the flexibility of the particles and achieve superior biodegradability appears to be as follows. The terminal carboxylic acid is able to adhere to the surface of the particles by virtue of its ionic affinity for the polyamine compound. On the surface, linear hydrocarbon chains are exposed and repel each other, positioning the linear chains themselves upright outside the particles; this portion may produce polyolefin-like flexibility and, therefore, may help increase the flexibility of the particles. Microorganisms, furthermore, can enter through spaces between the linear hydrocarbon chains; using a linear-chain saturated fatty acid, therefore, may help achieve superior biodegradability.

If the number of carbon atoms in the linear-chain saturated fatty acid is 14 or more, flexibility may be improved because of an increased height of the standing linear chains. If the number of carbon atoms is 22 or fewer, the entry of microorganisms may be prevented to a lesser extent by virtue of looser entanglement of the hydrocarbon chains; biodegradability, therefore, may be improved.

Hydroxy Fatty Acid

For improved biodegradability and improved flexibility, the hydroxy fatty acid may be a hydroxy fatty acid with 12 or more and 20 or fewer (C12 to C20) carbon atoms.

Examples of C12 to C20 hydroxy fatty acids include hydroxystearic acid, hydroxypalmitic acid, hydroxylauric acid, hydroxymyristic acid, and hydrogenated castor oil fatty acids.

The reason why using a hydroxy fatty acid in a coating layer may help increase the flexibility of the particles and achieve superior biodegradability appears to be as follows. The hydroxyl group in the hydroxy fatty acid adheres to the polyamine with its affinity for polyamines. Being immobilized, the fatty acid moiety of the adhering hydroxy fatty acid covers the surface with incomplete repulsion, forming a porous entangled structure that produces flexibility like a sponge. This structure may allow microorganisms to enter the cellulosic particles, enabling uniform biodegradation; this may help achieve superior biodegradability.

If the number of carbon atoms in the hydroxy fatty acid is 12 or more, the acid may form a sponge structure more easily by virtue of an increased fatty acid density; flexibility, therefore, may be improved. If the number of carbon atoms is 20 or fewer, pathways for microorganisms to enter through may be blocked to a lesser extent by virtue of a lower likelihood of entanglement between the long chains; biodegradability, therefore, may be improved.

Amino Acid Compound

"Amino acid compounds" refers to amino acids and amino acid derivatives.

Examples of amino acid compounds include lauryl leucine, lauryl arginine, and myristyl leucine.

The reason why using an amino acid compound in a coating layer may help increase the flexibility of the particles and achieve superior biodegradability appears to be as follows. Amino acid compounds have a strong tendency to form flat-shaped crystals after coating, and by virtue of their large specific surface area, the compound's own flexibility may be reflected in the particles, increasing the flexibility of the particles. The crystals, furthermore, are formed with spaces therebetween, through which microorganisms can enter slowly; the resultant uniform progress of biodegradation may help achieve superior biodegradability as well.

The total amount of the wax, linear-chain saturated fatty acid, hydroxy fatty acid, and/or amino acid compound may be 0.1% by mass or more and 2% by mass or less, preferably 0.2% by mass or more and 1% by mass or less, of the cellulosic particles as a whole.

The second coating layer may contain a polyvalent metal salt.

The presence of a polyvalent metal salt in the second coating layer may make it more likely that the cellulosic particles combine high biodegradability with high flexibility. A possible reason is as follows.

The wax, linear-chain saturated fatty acid, hydroxy fatty acid, and/or amino acid compound contained in the second layer adheres to the layer beneath it weakly. The resulting coating, therefore, tends to have many defects as a result of the self-aggregation of the compound (s). A polyvalent metal salt contained in the second coating layer together with the wax spreads uniformly throughout the wax, linear-chain saturated fatty acid, hydroxy fatty acid, and/or amino acid compound and may provide starting points for the compound (s) to aggregate uniformly and extensively; the formation of large-sized coating defects due to self-aggregation, therefore, may be limited, and the second coating layer may become more effective in improving flexibility. Although large-sized defects in the coating may be reduced, furthermore, a large and uniform population of small defects still present in the coating may allow microorganisms to enter through; the superior biodegradability, therefore, may be maintained.

For this reason, presumably, it may be more likely that the cellulosic particles combine high biodegradability with high flexibility.

Polyvalent metal salts are compounds formed by a divalent or higher-valency metal ion and an anion.

Examples of divalent or higher-valency metal ions as a component of a polyvalent metal salt include the ions of calcium, magnesium, copper, nickel, zinc, barium, aluminum, titanium, strontium, chromium, cobalt, iron, etc.

Examples of anions as a component of a polyvalent metal salt include inorganic or organic ions. Examples of inorganic ions include the chloride, bromide, iodide, nitrate, sulfate, and hydroxide ions. Examples of organic ions include organic acid ions, such as the carboxylate ion.

Examples of polyvalent metal salts include aluminum sulfate, polyaluminum chloride, iron chloride, and calcium hydroxide.

The polyvalent metal salt content relative to the wax content may be 0.1% by mass or more and 10% by mass or less, preferably 0.2% by mass or more and 5% by mass or less, even more preferably 0.3% by mass or more and 1% by mass or less.

The total amount of the wax and polyvalent metal salt relative to the entire second coating layer may be 90% by mass or more and 100% by mass or less, preferably 95% by mass or more and 100% by mass or less.

External Additive(s)

The cellulosic particles according to this exemplary embodiment may have at least one external additive selected from the group consisting of silicon-containing compound particles, metallic soap particles, fatty acid ester particles, and metal oxide particles.

In particular, the cellulosic particles according to this exemplary embodiment may have at least one external additive selected from the group consisting of silicon-containing compound particles and metallic soap particles.

The presence of such external additive (s) may make it more likely that the cellulosic particles according to this exemplary embodiment combine high biodegradability with high flexibility. A possible reason is as follows.

Silicon-containing compound particles and metallic soap particles are able to adhere to particles larger than themselves by electrostatic adhesion, and their own flexibility is higher than that of likewise adhesive metal oxide particles and fatty acid ester particles; these particles, therefore, may be highly effective in improving flexibility. By virtue of their particulate shape, the spaces between the particles may be sufficiently large for microorganisms to enter through; these particles, therefore, probably do not interfere with the superior biodegradability of the cellulose either.

For this reason, presumably, it may be more likely that the cellulosic particles combine high biodegradability with high flexibility.

"Silicon-containing compound particles" refers to particles containing silicon.

The silicon-containing compound particles may be particles of silicon or may be particles containing silicon and other element (s).

The silicon-containing compound particles may be silica particles.

The silica particles can be any silica-based, or $SiO_2$-based, particles, whether crystalline or amorphous. The silica particles, furthermore, may be particles produced from a raw-material silicon compound, such as waterglass or an alkoxysilane, or may be particles obtained by crushing quartz.

Using silica particles as silicon-containing compound particles may make it more likely that the cellulosic particles combine high biodegradability with high flexibility. A possible reason is as follows.

Silica adheres particularly strongly to the cellulosic particles by electrostatic adhesion, and its own flexibility, furthermore, is extremely high; with silica, therefore, the cellulosic particles may experience little change in texture over time for the reason described above and may be superior in biodegradability.

For this reason, presumably, it may be more likely that the cellulosic particles combine high biodegradability with high flexibility.

Metallic soap particles are metallic soap-based particles.

In this context, "metallic soap-based particles" refers to particles containing 90% by mass or more metallic soap in relation to the particles themselves.

A metallic soap is a metallic salt of a fatty acid, formed by a fatty acid and a metal bound together.

An example of a metallic salt of a fatty acid is a metallic salt of a C10 to C25 (preferably C12 to C22) fatty acid. Examples of metallic salts of C10 to C25 fatty acids include metallic salts of stearic acid, palmitic acid, An example of a metal in a metallic salt of a fatty acid is a divalent metal.

Examples of metals in metallic salts of fatty acids include magnesium, calcium, aluminum, barium, and zinc.

Fatty acid ester particles are particles including fatty acid ester particles as a base component.

In this context, "particles including fatty acid ester particles as a base component" refers to particles including 90% by mass or more fatty acid ester particles in relation to the particles themselves.

An example of a fatty acid ester is the product of esterification between a C10 to C25 saturated fatty acid and a C10 to C25 alcohol.

Examples of fatty acid esters include stearyl stearate, stearyl laurate, and stearyl palmitate.

Metal oxide particles are metal oxide-based particles.

In this context, "metal oxide-based particles" refers to particles containing 90% by mass or more metal oxide in relation to the particles themselves.

The metal oxide can be an oxide of a metal other than silicon.

Examples of metal oxides include zinc oxide, magnesium oxide, iron oxide, and aluminum oxide.

For texture (specifically, feel when touched) reasons, the volume-average particle diameter of the external additive may be 1 nm or more and 100 nm or less, preferably 5 nm or more and 30 nm or less.

The volume-average particle diameter of the external additive is measured in the same way as the volume-average particle diameter of the cellulose.

The amount of the external additive may be 0.1% by mass or more and 2% by mass or less of the mass of the cellulosic particles (cellulosic particles to which the external additive has yet to be added) as a whole.

Volume-Average Particle Diameter and Upper Geometric Standard Deviation by Number GSDv The volume-average particle diameter of the cellulosic particles according to this exemplary embodiment may be 3 μm or more and less than 10 μm, preferably 4 μm or more and 9 μm or less, more preferably 5 μm or more and 8 μm or less.

Making the volume-average particle diameter of the cellulosic particles according to this exemplary embodiment 3 μm or more and less than 10 μm may make it more likely that the cellulosic particles combine high biodegradability with high flexibility. A possible reason is as follows.

If the volume-average particle diameter is 3 μm or more, the diameter of the particles is not too small, and the deformation of the particles when exposed to an external force is not seriously interfered with; flexibility, therefore, may tend to be higher. If the volume-average particle diameter is less than 10 μm, furthermore, the degradation process, which starts at the surface, tends to proceed uniformly by virtue of a moderately large surface area; the cellulosic particles, therefore, may tend to be superior in biodegradability.

For this reason, presumably, it may be more likely that the cellulosic particles combine high biodegradability with high flexibility.

The upper geometric standard deviation by number GSDv of the cellulosic particles according to this exemplary embodiment may be 1.0 or greater and 1.7 or less, preferably 1.0 or greater and 1.5 or less, more preferably 1.0 or greater and 1.3 or less.

Making the upper geometric standard deviation by number GSDv of the cellulosic particles according to this exemplary embodiment 1.0 or greater and 1.7 or less may make it more likely that the cellulosic particles combine high biodegradability with high flexibility. A possible reason is as follows.

If the GSDv is 1.0 or greater and 1.7 or less, fine particles (small particles, smaller than 3 μm) and coarse particles (large particles, exceeding 10 μm) may be scarce; a flexibility loss caused by fine particles, therefore, may tend to be less likely. The inhibition of the biodegradation process by coarse particles (large particles, exceeding 10 μm), furthermore, may tend to be less likely to occur (because the cellulosic particles break down at their surface first).

For this reason, presumably, it may be more likely that the cellulosic particles combine high biodegradability with high flexibility.

The volume-average particle diameter and the upper geometric standard deviation GSDp of the cellulosic particles are measured as follows.

Particle diameters are measured using the LS particle size distribution analyzer "Beckman Coulter LS13 320 (Beckman Coulter)," and the cumulative distribution of particle diameters is plotted as a function of volume starting from the smallest diameter; then the particle diameter at which the cumulative percentage is 50% is determined as the volume-average particle diameter.

Separately, the cumulative distribution of particle diameters is plotted as a function of volume starting from the smallest diameter, and the particle diameters at which the cumulative percentage is 50% and 84% are defined as the number-average particle diameter, D50v, and particle diameter D84v by number, respectively. The upper geometric standard deviation by number GSDv is calculated according to the equation $GSDv=(D84v/D50v)^{1/2}$.

Sphericity

The sphericity of the cellulosic particles according to this exemplary embodiment may be 0.90 or greater, preferably 0.95 or greater, more preferably 0.97 or greater.

Making the sphericity of the cellulosic particles according to this exemplary embodiment 0.90 or greater may make it more likely that the cellulosic particles combine high biodegradability with high flexibility. A possible reason is as follows.

If the sphericity is 0.9 or greater, the particles may tend not to become extremely thin, and therefore tend not to lose flexibility, when an inward force acts on the particle surface. In that case, furthermore, the distance from the surface to the inner core of the particles, for which microorganisms need to go to decompose the particles, may be the shortest; biodegradability, therefore, may tend to be excellent.

For this reason, presumably, it may be more likely that the cellulosic particles combine high biodegradability with high flexibility.

The sphericity is given by (circumference of the equivalent circle)/(circumference)[ (circumference of a circle having the same projected area as the particle's image)/(circumference of the particle's projected image)]. Specifically, the sphericity is a value measured by the following method.

First, a portion of the cellulosic particles of interest is collected by aspiration in such a manner that it will form a flat stream, and this flat stream is photographed with a flash to capture the figures of the particles in a still image; then the particle images obtained are analyzed using a flow particle-image analyzer (Sysmex Corp. FPIA-3000) to give the sphericity. The number of particles sampled in the determination of the sphericity is 3500.

If the cellulosic particles have an external additive, the cellulosic particles of interest are dispersed in water containing a surfactant and then sonicated to eliminate the external additive, and the sonicated particles are subjected to the measurement.

Surface Smoothness

The surface smoothness of the cellulosic particles according to this exemplary embodiment may be 80% or higher, preferably 82% or higher and 99% or lower, more preferably 84% or higher and 98% or lower.

Making the surface smoothness of the cellulosic particles according to this exemplary embodiment 80% or higher may make it more likely that the cellulosic particles combine high biodegradability with high flexibility. A possible reason is as follows.

If the surface smoothness is 80% or higher, local stress concentration due to surface irregularities may be less likely to occur; flexibility, therefore, may tend to be higher. In that case, furthermore, the cellulosic particles may tend to be superior in biodegradability; some biodegrading microorganisms are relatively large in size, and, if the surface smoothness is 80% or higher, such large-sized microorganisms can get access to the particle surface.

For this reason, presumably, it may be more likely that the cellulosic particles combine high biodegradability with high flexibility.

The surface smoothness is measured through a procedure as described below.

An SEM image (magnification, 5,000 times) of the cellulosic particles, taken with a scanning electron microscope (SEM), is observed, and the smoothness M of the individual cellulosic particles is calculated according to the equation below. Then the arithmetic mean smoothness M of any ten or more cellulosic particles is reported as the surface smoothness. The closer the smoothness M is to 1, the closer the surface of the cellulosic particles is to smoothness.

$$M=(1-(S3)/(S2))\times 100$$

In this equation, S2 denotes the area of the cellulosic particle in the image (projected area), and S3 denotes, when the cellulosic particle in the image is superimposed on a circle having a projected area equal to S2, the sum of "the area outside the outline of the circle having a projected area equal to S2 and inside the outline of the cellulosic particle in the image" and "the area inside the outline of the circle having a projected area equal to S2 and outside the outline of the cellulosic particle in the image."

The method for superimposing the cellulosic particle in the image on a circle having a projected area equal to S2 is as follows.

The cellulosic particle in the image is superimposed on the circle having a projected area equal to S2 so that the area of overlap between the two images (the area inside the outline of the circle having a projected area equal to S2 and inside the outline of the cellulosic particle in the image) will be maximized.

Method for Producing the Cellulosic Particles

A method for producing the cellulosic particles may include a step of producing a particle precursor containing a cellulose acylate (particle precursor production step) and a step of saponifying the cellulose acylate contained in the particle precursor (saponification step).

Particle Precursor Production Step

A particle precursor containing a cellulose acylate is produced by any of methods (1) to (5) below.

(1) Kneading and milling, in which the ingredients are kneaded together, and the resulting mixture is milled and classified to give grains (2) A dry process, in which the shape of the grains obtained by kneading and milling is changed with the help of a mechanical impact force or thermal energy (3) Aggregation and coalescence, in which particle dispersions of the ingredients are mixed together, and the particles in the mixed dispersion are caused to aggregate and fused together under heat to give grains (4) Dissolution and suspension, in which a solution of the ingredients in an organic solvent is suspended in an aqueous medium to form grains containing the ingredients (5) Kneading and dissolution, in which the ingredients and a binder are kneaded together, the resulting mixture is pelletized by extrusion, and the resulting pellets are stirred in a solvent for the binder to form grains In this context, a cellulose acylate is a cellulose derivative in which at least one of the hydroxy groups in cellulose has been replaced with an aliphatic acyl group (acylated). Specifically, a cellulose acylate is a cellulose derivative in which at least one of the hydroxy groups in cellulose has been replaced with —CO—$R^{AC}$ ($R^{AC}$ represents an aliphatic hydrocarbon group.).

Saponification Step

Then the cellulose acylate contained in the particle precursor is saponified.

Through this step, the aliphatic acyl group (s) in the cellulose acylate is hydrolyzed, and the cellulose turns into cellulose.

The saponification step is performed by, for example, adding sodium hydroxide to a dispersion of the particle precursor and stirring the dispersion.

Coating Layer Formation Step

If cellulosic particles having coating layer (s) are produced, the production method may include a step of forming the coating layer (s) (coating layer formation step) after the above saponification step.

If the coating layer formation step is performed, the coating layer (s) is formed using the particles obtained through the above saponification step as core particles.

First, an aqueous dispersion in which the core particles are dispersed is prepared. The core particles may be cleaned with acid before the preparation of the aqueous dispersion.

Then the aqueous dispersion in which the core particles are dispersed is mixed with an aqueous solution containing the compound (s) that will form the first coating layer. This causes, for example, hydroxyl groups in the resin contained in the core particles to react, for example with amine sites in the surface-treating polymer (s), to form the first coating layer. Then the aqueous dispersion in which the core particles with the first coating layer formed thereon are dispersed is mixed with an emulsion containing the compound (s) that will form the second coating layer. Through this, the second coating layer is formed.

Then the cellulosic particles having coating layers are removed from the mixture. The removal of the cellulosic particles having coating layers is done by, for example, filtering the mixture. The removed cellulosic particles having coating layers may be washed with water. This may help eliminate unreacted residue of the surface-treating polymer (s). Then the cellulosic particles having coating layers are dried, giving cellulosic particles according to this exemplary embodiment.

Addition Step

External additive (s) may be added to the resulting cellulosic particles.

An example of an addition step is a treatment in which the external additive (s) is added to the cellulosic particles using equipment like a mixing mill, V-blender, Henschel mixer, or Lödige mixer.

Applications

Applications of the cellulosic particles according to this exemplary embodiment include grains for use as cosmetics, a rolling agent, an abrasive, a scrubbing agent, display spacers, a material for bead molding, light-diffusing particles, a resin-strengthening agent, a refractive index control agent, a biodegradation accelerator, a fertilizer, water-absorbent particles, toner particles, and anti-blocking particles.

An application of the cellulosic particles according to this exemplary embodiment may be cosmetics.

An application of the cellulosic particles according to this exemplary embodiment may be a cosmetic additive in particular.

Potentially superior in flexibility, the cellulosic particles according to this exemplary embodiment, if used as a cosmetic additive, may help the cosmetic product to spread well on the skin when the cosmetic product is put on the skin.

The cellulosic particles according to this exemplary embodiment can be applied as cosmetic additives, for example to base makeup cosmetics (e.g., foundation primer, concealer, foundation, and face powder); makeup cosmetics (e.g., lipstick, lip gloss, lip liner, blush, eye shadow, eyeliner, mascara, eyebrow powder, nail products, and nail care cosmetics); and skincare cosmetics (e.g., face wash, facial cleanser, toner, milky lotion, serum, face packs, face masks, and cosmetics for the care of the eye and mouth areas).

The resin particles according to this exemplary embodiment may be used as a cosmetic additive to makeup cosmetics in particular, because cosmetic additives to makeup cosmetics can need to be flexible and biodegradable.

EXAMPLES

Examples will now be described, but no aspect of the present disclosure is limited to these examples. In the following description, "parts" and "%" are all by mass unless stated otherwise.

Preparation of Materials

The following materials are prepared.

Cellulose Acylates

Cel1: Daicel "L-20"; cellulose acetate; number-average molecular weight, 47000.

Cel2: Daicel "L-50"; cellulose acetate; number-average molecular weight, 58000.

Cel3: Eastman Chemical "CAP482-20"; cellulose acetate propionate; number-average molecular weight, 75000.

Cel4: Eastman Chemical "CAB381-20"; cellulose acetate butyrate; number-average molecular weight, 70000.

Cel5: Eastman Chemical "CA398-6"; cellulose acetate; number-average molecular weight, 35000.

Cel6: Eastman Chemical "CAP482-0.5"; cellulose acetate propionate; number-average molecular weight, 25000.

Cel7: Eastman Chemical "CAP-504-0.2"; cellulose acetate propionate; number-average molecular weight, 15000.

Compounds for the First Coating Layer

Polyamine Compounds

Fir1: Nippon Shokubai "EPOMIN SP-003"; polyethyleneimine; molecular weight, 300

Fir2: Nippon Shokubai "EPOMIN SP-006"; polyethyleneimine; molecular weight, 600

Fir3: Nippon Shokubai "EPOMIN SP-012"; polyethyleneimine; molecular weight, 1200

Fir4: Nippon Shokubai "EPOMIN SP-018"; polyethyleneimine; molecular weight, 1800

Fir5: Nippon Shokubai "EPOMIN SP-200"; polyethyleneimine; molecular weight, 10000

Fir6: Nippon Shokubai "EPOMIN HM-2000"; polyethyleneimine; molecular weight, 30000

Fir7: Nippon Shokubai "EPOMIN P-1000"; polyethyleneimine; molecular weight, 70000

Fir8: Nittobo Medical "PAA-01"; polyallylamine; molecular weight, 1600

Fir9: Nittobo Medical "PAA-03"; polyallylamine; molecular weight, 3000
Fir10: Nittobo Medical "PAA-05"; polyallylamine; molecular weight, 5000
Fir11: Nittobo Medical "PAA-08"; polyallylamine; molecular weight, 8000
Fir12: Nittobo Medical "PAA-15C"; polyallylamine; molecular weight, 15000
Fir13: Nittobo Medical "PAA-25"; polyallylamine; molecular weight, 25000
Fir14: Mitsubishi Chemical "Polyvinylamine," polyvinylamine
Fir15: JNC "Polylysine 10," polylysine
Fir16: Ichimaru Pharcos "Polylysine 10," polylysine Polyvinyl Alcohol and Polyvinylpyrrolidone
Fir17: Mitsubishi Chemical "GOHSENOL N-300," polyvinyl alcohol
Fir18: Nippon Shokubai "K-30," polyvinylpyrrolidone Compounds for the Second Coating Layer
Waxes
Sec1: Senka "CN-100," carnauba wax
Sec2: Toa Kasei "TOWAX-1F3," carnauba wax
Sec3: Toa Kasei "TOWAX-1F6," carnauba wax
Sec4: Toa Kasei "TOWAX-1F8," carnauba wax
Sec5: Toa Kasei "TOWAX-1F12," carnauba wax
Sec6: Toa Kasei "TOWAX-5B2," carnauba wax
Sec7: Toa Kasei "TOWAX-1B4," carnauba wax
Sec8: Toa Kasei "TOWAX-4F2," candelilla wax
Sec9: Toa Kasei "TOWAX-4F3," candelilla wax
Sec10: Toa Kasei "TOWAX-4F4," candelilla wax
Sec11: Toa Kasei "TOWAX-6B2," Rosa damascena flower wax
Sec12: Toa Kasei "TOWAX-6F2," sunflower seed wax
Sec13: Kokura Gosei Kogyo, rice bran wax
Sec14: Boso Oil and Fat "SS-1," rice bran wax
Sec15: Nisshin Oillio "COSMOL 222," diisostearyl malate Linear-Chain Saturated Fatty Acids
Sec16: NOF "NAA-222S," behenic acid (C22)
Sec17: FUJIFILM Shonan Wako "Arachidic Acid," arachidic acid (C20)
Sec18: FUJIFILM Shonan Wako "Palmitic Acid," palmitic acid (C14)
Sec19: FUJIFILM Shonan Wako "Lauric Acid," lauric acid (C12)
Sec20: FUJIFILM Shonan Wako "Lignoceric Acid," lignoceric acid (C24)

Hydroxy Fatty Acids
Sec21: Itoh Oil Chemicals "12-Hydroxystearic Acid," hydroxystearic acid
Sec22: NOF, "Hydrogenated Castor Oil Fatty Acid," a hydrogenated castor oil fatty acid Amino Acid Compound
Sec23: Ajinomoto "AMIHOPE LL," lauroyl lysine Polyvalent Metal Salts
Sec31: FUJIFILM Wako Pure Chemical, aluminum sulfate
Sec32: FUJIFILM Wako Pure Chemical, polyaluminum chloride
Sec33: FUJIFILM Wako Pure Chemical, iron chloride
Sec34: FUJIFILM Wako Pure Chemical, calcium hydroxide External Additives
Silicon-Containing Compound Particles
Sur1: Nippon Aerosil "AEROSIL R972," silica dimethyl silylate particles, average particle diameter=16 nm
Sur2: Nippon Aerosil "AEROSIL RY200S," silica dimethicone silylate particles, average particle diameter=12 nm Metallic Soap Particles
Sur3: NOF "MZ-2," zinc stearate particles, volume-average particle diameter=1500 nm
Sur4: NOF "Magnesium Stearate S," magnesium stearate particles, volume-average particle diameter=1000 nm Fatty Acid Ester Particles
Sur6: Kao "EXCEPARL SS," stearyl stearate particles, volume-average particle diameter=1000

Metal Oxide Particles
Sur7: Sakai Chemical "FINEX-50," zinc oxide particles, volume-average particle diameter=15000 nm Example 1

Particle Precursor Production Step

As a cellulose acylate, 130 parts of Cell is dissolved completely in 870 parts of ethyl acetate. The resulting solution is added to a water-based liquid containing 45 parts of calcium carbonate and 500 parts of purified water, and the resulting mixture is stirred for 3 hours (hereinafter referred to as "the first stirring time"). A dispersion of 4 parts of carboxymethyl cellulose (hereinafter also referred to as "CMC") and 200 parts methyl ethyl ketone in 600 parts of purified water is added, and the resulting mixture is stirred for 5 minutes using a high-speed emulsifier. Ten parts of sodium hydroxide is added, and the resulting mixture is heated to 80° C. and stirred for 3 hours to eliminate the ethyl acetate and the methyl ethyl ketone. The same amount of diluted hydrochloric acid as the sodium hydroxide is added, the residue is collected by filtration, and the collected solids are dispersed once again in purified water to give a particle precursor dispersion (solids concentration, 10%).

Saponification Step

A mixture obtained by adding 17.5 parts of a 20% aqueous solution of sodium hydroxide to 500 parts of the particle precursor dispersion is stirred for 6 hours at a saponification temperature of 30° C. After the pH is adjusted to 7 with hydrochloric acid, the saponified slurry is cleaned by repeated filtration and washing until the electrical conductivity of the filtrate is 10 µs/cm or less, yielding cellulosic particles.

Coating Layer Formation Step

One thousand parts of the cellulosic particles, which are core particles, and 10000 parts of deionized water are mixed together to give 500 parts of a core particle dispersion. Five parts of Fir16 as a compound that will form the first coating layer is added to the core particle dispersion, and the resulting mixture is stirred for 1 hour to make the compound form the first coating layer, yielding a dispersion of cellulosic particles having a first coating layer.

Subsequently, an emulsion for the formation of the second coating layer is prepared by mixing 4 parts of Sec1 as a wax and 50 parts of purified water together using a high-speed emulsifier.

All of the emulsion for the formation of the second coating layer is added to the dispersion of cellulosic particles having a first coating layer, and the resulting mixture is stirred for 24 hours to make the wax form the second coating layer, yielding a dispersion of cellulosic particles having first and second coating layers.

The cellulosic particles having first and second coating layers are cleaned by repeated filtration and washing until the electrical conductivity of the filtrate is 10 µs/cm or less, yielding cellulosic particles having first and second coating layers.

Examples 2 to 7

Cellulosic particles are obtained through the same procedure as in Example 1, except that in the particle precursor production step, the cellulose acylate species is as in Table 1.

Examples 8 to 24

Cellulosic particles having coating layers are obtained through the same procedure as in Example 1, except that in the coating layer formation step, the species of the compound that will form the first coating layer ("First-layer compound" in Table 1) is as in Table 1.

Examples 25 to 38

Cellulosic particles having first and second coating layers are obtained through the same procedure as in Example 1, except that in the coating layer formation step, the wax species is as in Table 1.

Examples 39 to 41

Cellulosic particles having first and second coating layers are obtained through the same procedure as in Example 1, except that in the coating layer formation step, the amount of the compound that will form the first coating layer and the amount of wax are as in Table 1.

Example 42

Particle Precursor Production Step, Saponification Step, and Coating Layer Formation Step Cellulosic particles having first and second coating layers are obtained through the same procedure as in Example 1.

Addition Step

As an external additive, 0.6 parts of Sur1 is added to 30 parts of the cellulosic particles having first and second coating layers, and the ingredients are mixed together in a mixing mill (WONDER CRUSHER, Osaka Chemical) to give cellulosic particles having an external additive.

Examples 44, 45, and 47 to 50

Cellulosic particles having an external additive are obtained through the same procedure as in Example 42, except that in the addition step, the external additive and its amount are as in Table 1.

Examples 51 to 58

Cellulosic particles having an external additive are obtained through the same procedure as in Example 1 or 42, except that in the particle precursor production step, the amount of calcium carbonate, the first stirring time, the amount of carboxymethyl cellulose, and the amount of sodium hydroxide are as in Table 1.

Comparative Examples 10 and 11

Cellulosic particles having a coating layer are obtained through the same procedure as in Example 1 or 42, except that the coating layer formation step is done without the process of adding 4 parts of Sec1 as a compound that will form the second coating layer to the dispersion of core particles and stirring the resulting mixture.

Examples 61 to 64

Cellulosic particles having an external additive are obtained through the same procedure as in Example 42, except that in the coating layer formation step, the wax species is as in Table 1 and that in preparing the emulsion for the formation of the second coating layer, the polyvalent metal salt specified in Table 1, its amount being as in Table 1, is added together with the wax and the purified water.

Examples 65 to 78

Cellulosic particles having coating layer (s) are obtained through the same procedure as in the above Examples, except that the parameters are changed to those indicated in Table 1.

Comparative Examples 1 to 5

The following particles are used as the cellulosic particles of each example.

Comparative Example 1: CELLULOBEADS D10 (Daito Kasei, cellulose-based cellulosic particles. No coating layer and no external additive.)

Comparative Example 2: OTS-0.5A CELLULOBEADS D10 (Daito Kasei, cellulosic particles having a cellulose-based core particle and a coating layer containing triethoxyoctylsilane. No external additive.)

Comparative Example 3: S-STM CELLULOBEADS D-5 (Daito Kasei, cellulosic particles having a cellulose-based core particle and a coating layer containing magnesium stearate. No external additive.)

Comparative Example 4: CELLUFLOW C25 (JNC, cellulose-based cellulosic particles. No coating layer and no external additive.)

Comparative Example 5: CELLUFLOW TA25 CELLULOBEADS D-10 (JNC, diacetyl cellulose-based cellulosic particles. No coating layer and no external additive.)

Comparative Example 6

Cellulosic particles are obtained according to the procedure described in Example 1 in Japanese Patent No. 6921923. These cellulosic particles have a cellulose-based core particle and a coating layer containing zinc stearate and have no external additive. The specific production process is as follows.

An oil phase is prepared by dissolving 150 parts by mass of dicellulose acetate (CA398-6, Eastman Chemical) in 1350 parts by mass of ethyl acetate. An aqueous phase is prepared by dissolving 100 parts by mass of polyvinyl alcohol in 1250 parts of deionized water. The prepared aqueous phase is mixed with the oil phase, and the resulting mixture is stirred at 1000 rpm for 3 minutes using a dissolver. The mixture is further stirred at 2000 rpm for 10 minutes, giving a suspension in which oil droplets are dispersed uniformly.

While this suspension is stirred at 500 rpm, 2000 parts by mass of deionized water is introduced thereinto over 90 minutes to give a dispersion of resin particles. The resin particles are collected by filtration, washed, and then put into deionized water and stirred there, collected by filtration, and washed; then the resulting resin particles are dispersed in 2500 parts of deionized water. The pH is adjusted to 13.0 or below by adding sodium hydroxide, the dispersion is heated to 50° C. for hydrolysis, and then the dispersion is neutralized with hydrochloric acid. The product is collected by filtration, washed, then stirred in deionized water, collected by filtration, and washed, and then dried and crushed to give cellulosic core particles.

Fifty grams of the resulting cellulosic core particles and 1.5 g of zinc stearate (SPZ-100F, Sakai Chemical Industry) are put into a compact mixer and dry-mixed together for 3 minutes, giving cellulosic particles composed of cellulosic core particles and zinc stearate on the surface thereof.

Comparative Example 7

Cellulosic particles are obtained according to the procedure described in Example 2 in Japanese Patent No. 6921923. These cellulosic particles have a cellulose-based core particle and a coating layer containing magnesium stearate and have no external additive. The specific production process is as follows.

Cellulosic particles composed of cellulosic core particles and magnesium stearate on the surface thereof are obtained in the same way as in Comparative Example 7, except that 1.5 g of magnesium stearate (SPX-100F, Sakai Chemical Industry) is used instead of the zinc stearate.

Comparative Example 8

Cellulosic particles are obtained according to the procedure described in Example 1 in Japanese Unexamined Patent Application Publication No. 2021-021044. These cellulosic particles are cellulose-based ones and have no coating layer and no external additive. The specific production process is as follows.

A 4.8-g portion of cyclohexanone is stirred with 0.2 g of diacetyl cellulose (L20, Daicel) added thereto. The resulting mixture is further stirred at 60° C. for 3 hours to give a solution with a diacetyl cellulose concentration of 4% by mass; this solution is the dispersed phase.

Fifty grams of purified water is stirred with 0.1 g of sodium dodecylbenzenesulfonate and 3.5 g of cyclohexanone added thereto. The resulting mixture is warmed to 60° C. to give an aqueous medium; this aqueous medium is the continuous phase. The dispersed phase, preheated to 60° C., and the continuous phase, also preheated to 60° C., are put into different inlets of a rotational cylinder emulsifier (cylinder outer diameter, 78 mm; cylinder length, 215 mm; cylinder inner diameter, 80 mm; clearance, 1 mm; Tipton) at 1 mL/min using a syringe pump (high-pressure microfeeder JP-H, Furue Science) and at 10 mL/min using a plunger pump (NP-KX-840, Nihon Seimitsu Kagaku), respectively, and emulsified at a cylinder rotational frequency of 2000 rpm for an emulsification period of 138 seconds to give an oil-in-water emulsion.

This oil-in-water emulsion is cooled to 5° C. and fed to a double-tube merger, and the diacetyl cellulose is precipitated by feeding purified water at 10 mL/min, yielding a solution of particle slurry.

The resulting diacetyl cellulose particles are put into a mixture of 7 parts by mass of a 55% by mass aqueous solution of methanol and 3.5 parts by mass of a 20% by mass aqueous solution of sodium hydroxide, the concentrations being relative to the diacetyl cellulose particles, and the diacetyl cellulose particles are saponified by stirring the resulting mixture at 35° C. for 20 hours, yielding cellulosic particles.

Comparative Example 9

Cellulosic particles are obtained according to the procedure described in Example 1 in Japanese Unexamined Patent Application Publication No. 2021-021045. These cellulosic particles are cellulose-based ones and have no coating layer and no external additive. The specific production process is as follows.

Diacetyl cellulose (L20, Daicel) is added to 64 g of ethyl acetate and 16 g of acetone, and the resulting mixture is stirred at 50° C. for 3 hours or longer to give a diacetyl cellulose solution with a concentration of 10% by mass.

This solution is poured into 82.8 g of purified water at 50° C. containing 0.18 g of sodium dodecylbenzenesulfonate and 6.2 g of ethyl acetate, and the resulting mixture is stirred at a rotational frequency of 300 rpm for 10 minutes to yield a crude emulsion. A porous membrane (a cylindrical SPG membrane having an outer diameter of 10 mm, a membrane thickness of 1 mm, and a pore diameter of 50 μm; SPG Technology) is immersed in a container holding 331.2 g of purified water at 50° C. containing 0.71 g of sodium dodecylbenzenesulfonate and 24.9 g of ethyl acetate, and the container in which the crude emulsion has been prepared is coupled to the inside of this porous membrane. The crude emulsion is forced through the membrane by applying a pressure of 100 kPa to the container in which the crude emulsion has been prepared; membrane emulsification induced by this gives an oil droplet-in-water emulsion.

This emulsion is cooled, and when its temperature is 20° C., 444 mL of purified water is added dropwise, giving spherical diacetyl cellulose particles. Then the dispersion is centrifuged and filtered, and the residual diacetyl cellulose particles are washed thoroughly with a plenty of water and collected by filtration, yielding 2.8 g of diacetyl cellulose particles.

The resulting diacetyl cellulose particles are put into a mixture of a 55% aqueous solution of methanol (7 parts by mass) and a 20% by mass aqueous solution of sodium hydroxide (3.5 parts by mass), the concentrations being relative to the diacetyl cellulose particles, and the diacetyl cellulose is saponified by stirring the resulting mixture at 35° C. for 20 hours, yielding cellulosic particles.

Evaluations

For the cellulosic particles obtained in each example or comparative example, the following particle characteristics are measured according to the methods previously described herein. A 5-day biodegradation of less than 20% and a 60-day biodegradation
Volume-average particle diameter of the cellulosic particles ("Particle diameter" in the tables)
Upper geometric standard deviation by number of the cellulosic particles ("GSDv" in the tables)
Sphericity of the cellulosic particles
Number-average molecular weight of the cellulose in the cellulosic particles ("Mn" in the tables)
Surface smoothness of the cellulosic particles
Percentage Biodegradation
The percentage biodegradation (percentage biodegradation after 28 days) of the cellulosic particles obtained is measured and calculated as per JIS K6950:2000 (ISO 14851:1999).

Specifically, the percentage biodegradation is calculated from the oxygen demands of the cellulosic particles of interest (hereinafter, the test substance) and a reference substance according to the equation below. If the percentage biodegradation is 60% or higher, the cellulosic particles are considered highly biodegradable.

$$\text{Biodegradability (\%)} = (A-B)/C \times 100$$

A (mg): Biochemical oxygen demand of the test substance
B (mg): Mean biochemical oxygen demand of the control substance
C (mg): Theoretical maximum amount of oxygen required to oxidize the test substance The oxygen demands, furthermore, are measured using a closed-system oxygen consumption meter under the following conditions.

Inoculum: Activated sludge in an aerobic reactor at a sewage treatment plant basically for the treatment of domestic liquid waste
Control substance: Microcrystalline cellulose
Test substance concentration: 100 mg/L
Control substance concentration: 100 mg/L
Inoculum concentration: 150 mg/L
Test solution volume: 300 mL
Testing temperature: 25° C.+1° C.
Duration of incubation: 30 days Flexibility The Young's modulus of the cellulosic particles obtained is calculated using a micro-compression tester (MCT-510, Shimadzu).

Specifically, the cellulosic particles are sprinkled over the sample stage, and while the stage is monitored with an optical microscope, the initial position is adjusted so that one single particle will come right beneath the tip of the indenter. The particle is compressed at a stage moving speed of 0.2 μm/s, and the test force as a function of displacement is detected continuously. The measurement is ended when the particle breaks completely. The resulting stress-strain curve is represented by two straight lines with different slopes.

With the point of intersection between these two straight lines as the yield point ($\varepsilon y$, $\sigma y$), the slope of a straight line drawn between this point and the origin is defined as apparent Young's modulus Ey as in the following equation.

$$Ey = \sigma y / \varepsilon y \quad \text{Equation:}$$

Based on the Young's modulus obtained, the flexibility of the cellulosic particles is assessed. The lower the Young's modulus is, the more flexible the cellulosic particles are. If the Young's modulus is lower than 80 MPa, the particles are considered highly flexible.

TABLE 1-1

| | | | Particle precursor production step | | | | Saponification step | | |
|---|---|---|---|---|---|---|---|---|---|
| | Particle number | Resin species | Amount of calcium carbonate (parts) | First stirring time (hr) | Amount of CMC (parts) | Amount of sodium hydroxide (g) | Amount of 20% NaOHaq (parts) | Saponification temperature (° C.) | Duration of stirring (hr) |
| Example 1  | Par1  | Cel1 | 50 | 3 | 4 | 10 | 17.5 | 30 | 6 |
| Example 2  | Par2  | Cel2 | 50 | 3 | 4 | 10 | 17.5 | 30 | 6 |
| Example 3  | Par3  | Cel3 | 50 | 3 | 4 | 10 | 17.5 | 30 | 6 |
| Example 4  | Par4  | Cel4 | 50 | 3 | 4 | 10 | 17.5 | 30 | 6 |
| Example 5  | Par5  | Cel5 | 50 | 3 | 4 | 10 | 17.5 | 30 | 6 |
| Example 6  | Par6  | Cel6 | 50 | 3 | 4 | 10 | 17.5 | 30 | 6 |
| Example 7  | Par7  | Cel7 | 50 | 3 | 4 | 10 | 17.5 | 30 | 6 |
| Example 8  | Par8  | Cel1 | 50 | 3 | 4 | 10 | 17.5 | 30 | 6 |
| Example 9  | Par9  | Cel1 | 50 | 3 | 4 | 10 | 17.5 | 30 | 6 |
| Example 10 | Par10 | Cel1 | 50 | 3 | 4 | 10 | 17.5 | 30 | 6 |
| Example 11 | Par11 | Cel1 | 50 | 3 | 4 | 10 | 17.5 | 30 | 6 |
| Example 12 | Par12 | Cel1 | 50 | 3 | 4 | 10 | 17.5 | 30 | 6 |
| Example 13 | Par13 | Cel1 | 50 | 3 | 4 | 10 | 17.5 | 30 | 6 |
| Example 14 | Par14 | Cel1 | 50 | 3 | 4 | 10 | 17.5 | 30 | 6 |
| Example 15 | Par15 | Cel1 | 50 | 3 | 4 | 10 | 17.5 | 30 | 6 |
| Example 16 | Par16 | Cel1 | 50 | 3 | 4 | 10 | 17.5 | 30 | 6 |
| Example 17 | Par17 | Cel1 | 50 | 3 | 4 | 10 | 17.5 | 30 | 6 |
| Example 18 | Par18 | Cel1 | 50 | 3 | 4 | 10 | 17.5 | 30 | 6 |
| Example 19 | Par19 | Cel1 | 50 | 3 | 4 | 10 | 17.5 | 30 | 6 |
| Example 20 | Par20 | Cel1 | 50 | 3 | 4 | 10 | 17.5 | 30 | 6 |
| Example 21 | Par21 | Cel1 | 50 | 3 | 4 | 10 | 17.5 | 30 | 6 |
| Example 22 | Par22 | Cel1 | 50 | 3 | 4 | 10 | 17.5 | 30 | 6 |
| Example 23 | Par23 | Cel1 | 50 | 3 | 4 | 10 | 17.5 | 30 | 6 |
| Example 24 | Par24 | Cel1 | 50 | 3 | 4 | 10 | 17.5 | 30 | 6 |
| Example 25 | Par25 | Cel1 | 50 | 3 | 4 | 10 | 17.5 | 30 | 6 |
| Example 26 | Par26 | Cel1 | 50 | 3 | 4 | 10 | 17.5 | 30 | 6 |
| Example 27 | Par27 | Cel1 | 50 | 3 | 4 | 10 | 17.5 | 30 | 6 |
| Example 28 | Par28 | Cel1 | 50 | 3 | 4 | 10 | 17.5 | 30 | 6 |
| Example 29 | Par29 | Cel1 | 50 | 3 | 4 | 10 | 17.5 | 30 | 6 |
| Example 30 | Par30 | Cel1 | 50 | 3 | 4 | 10 | 17.5 | 30 | 6 |
| Example 31 | Par31 | Cel1 | 50 | 3 | 4 | 10 | 17.5 | 30 | 6 |
| Example 32 | Par32 | Cel1 | 50 | 3 | 4 | 10 | 17.5 | 30 | 6 |
| Example 33 | Par33 | Cel1 | 50 | 3 | 4 | 10 | 17.5 | 30 | 6 |
| Example 34 | Par34 | Cel1 | 50 | 3 | 4 | 10 | 17.5 | 30 | 6 |
| Example 35 | Par35 | Cel1 | 50 | 3 | 4 | 10 | 17.5 | 30 | 6 |
| Example 36 | Par36 | Cel1 | 50 | 3 | 4 | 10 | 17.5 | 30 | 6 |
| Example 37 | Par37 | Cel1 | 50 | 3 | 4 | 10 | 17.5 | 30 | 6 |
| Example 38 | Par38 | Cel1 | 50 | 3 | 4 | 10 | 17.5 | 30 | 6 |
| Example 39 | Par39 | Cel1 | 50 | 3 | 4 | 10 | 17.5 | 30 | 6 |

TABLE 1-1-continued

| | | | Particle precursor production step | | | | Saponification step | | |
|---|---|---|---|---|---|---|---|---|---|
| | Particle number | Resin species | Amount of calcium carbonate (parts) | First stirring time (hr) | Amount of CMC (parts) | Amount of sodium hydroxide (g) | Amount of 20% NaOHaq (parts) | Saponification temperature (° C.) | Duration of stirring (hr) |
| Example 40 | Par40 | Cel1 | 50 | 3 | 4 | 10 | 17.5 | 30 | 6 |
| Example 41 | Par41 | Cel1 | 50 | 3 | 4 | 10 | 17.5 | 30 | 6 |

TABLE 1-2

| | | Coating layer formation step | | | | | | | |
|---|---|---|---|---|---|---|---|---|---|
| | | First-layer compound | | Second-layer compound | | Second-layer compound, polyvalent metal salt | | Addition step External additive | |
| | Particle number | Species | Amount (parts) | Species | Amount (parts) | Species | Amount (parts) | Species | Amount (parts) |
| Example 1 | Par1 | Fir16 | 5 | Sec1 | 4 | | | | |
| Example 2 | Par2 | Fir16 | 5 | Sec1 | 4 | | | | |
| Example 3 | Par3 | Fir16 | 5 | Sec1 | 4 | | | | |
| Example 4 | Par4 | Fir16 | 5 | Sec1 | 4 | | | | |
| Example 5 | Par5 | Fir16 | 5 | Sec1 | 4 | | | | |
| Example 6 | Par6 | Fir16 | 5 | Sec1 | 4 | | | | |
| Example 7 | Par7 | Fir16 | 5 | Sec1 | 4 | | | | |
| Example 8 | Par8 | Fir1 | 5 | Sec1 | 4 | | | | |
| Example 9 | Par9 | Fir2 | 5 | Sec1 | 4 | | | | |
| Example 10 | Par10 | Fir3 | 5 | Sec1 | 4 | | | | |
| Example 11 | Par11 | Fir4 | 5 | Sec1 | 4 | | | | |
| Example 12 | Par12 | Fir5 | 5 | Sec1 | 4 | | | | |
| Example 13 | Par13 | Fir6 | 5 | Sec1 | 4 | | | | |
| Example 14 | Par14 | Fir7 | 5 | Sec1 | 4 | | | | |
| Example 15 | Par15 | Fir8 | 5 | Sec1 | 4 | | | | |
| Example 16 | Par16 | Fir9 | 5 | Sec1 | 4 | | | | |
| Example 17 | Par17 | Fir10 | 5 | Sec1 | 4 | | | | |
| Example 18 | Par18 | Fir11 | 5 | Sec1 | 4 | | | | |
| Example 19 | Par19 | Fir12 | 5 | Sec1 | 4 | | | | |
| Example 20 | Par20 | Fir13 | 5 | Sec1 | 4 | | | | |
| Example 21 | Par21 | Fir14 | 5 | Sec1 | 4 | | | | |
| Example 22 | Par22 | Fir15 | 5 | Sec1 | 4 | | | | |
| Example 23 | Par23 | Fir17 | 5 | Sec1 | 4 | | | | |
| Example 24 | Par24 | Fir18 | 5 | Sec1 | 4 | | | | |
| Example 25 | Par25 | Fir16 | 5 | Sec2 | 4 | | | | |
| Example 26 | Par26 | Fir16 | 5 | Sec3 | 4 | | | | |
| Example 27 | Par27 | Fir16 | 5 | Sec4 | 4 | | | | |
| Example 28 | Par28 | Fir16 | 5 | Sec5 | 4 | | | | |
| Example 29 | Par29 | Fir16 | 5 | Sec6 | 4 | | | | |
| Example 30 | Par30 | Fir16 | 5 | Sec7 | 4 | | | | |
| Example 31 | Par31 | Fir16 | 5 | Sec8 | 4 | | | | |
| Example 32 | Par32 | Fir16 | 5 | Sec9 | 4 | | | | |
| Example 33 | Par33 | Fir16 | 5 | Sec10 | 4 | | | | |
| Example 34 | Par34 | Fir16 | 5 | Sec11 | 4 | | | | |
| Example 35 | Par35 | Fir16 | 5 | Sec12 | 4 | | | | |
| Example 36 | Par36 | Fir16 | 5 | Sec13 | 4 | | | | |
| Example 37 | Par37 | Fir16 | 5 | Sec14 | 4 | | | | |
| Example 38 | Par38 | Fir16 | 5 | Sec15 | 4 | | | | |
| Example 39 | Par39 | Fir16 | 10 | Sec1 | 4 | | | | |
| Example 40 | Par40 | Fir16 | 5 | Sec1 | 8 | | | | |
| Example 41 | Par41 | Fir16 | 10 | Sec1 | 8 | | | | |

TABLE 1-3

| | | | Particle precursor production step | | | | Saponification step | | |
|---|---|---|---|---|---|---|---|---|---|
| | Particle number | Resin species | Amount of calcium carbonate (parts) | First stirring time (hr) | Amount of CMC (parts) | Amount of sodium hydroxide (g) | Amount of 20% NaOHaq (parts) | Saponification temperature (° C.) | Duration of stirring (hr) |
| Example 42 | Par42 | Cel1 | 50 | 3 | 4 | 10 | 17.5 | 30 | 6 |
| Example 43 | Par43 | Cel1 | 50 | 3 | 4 | 10 | 17.5 | 30 | 6 |

TABLE 1-3-continued

|  | | Particle precursor production step | | | | Saponification step | | |
| --- | --- | --- | --- | --- | --- | --- | --- | --- |
|  | Particle number | Resin species | Amount of calcium carbonate (parts) | First stirring time (hr) | Amount of CMC (parts) | Amount of sodium hydroxide (g) | Amount of 20% NaOHaq (parts) | Saponification temperature (° C.) | Duration of stirring (hr) |
| Example 44 | Par44 | Cel1 | 50 | 3 | 4 | 10 | 17.5 | 30 | 6 |
| Example 45 | Par45 | Cel1 | 50 | 3 | 4 | 10 | 17.5 | 30 | 6 |
| Example 47 | Par47 | Cel1 | 50 | 3 | 4 | 10 | 17.5 | 30 | 6 |
| Example 48 | Par48 | Cel1 | 50 | 3 | 4 | 10 | 17.5 | 30 | 6 |
| Example 49 | Par49 | Cel1 | 50 | 3 | 4 | 10 | 17.5 | 30 | 6 |
| Example 50 | Par50 | Cel1 | 50 | 3 | 4 | 10 | 17.5 | 30 | 6 |
| Example 51 | Par51 | Cel1 | 50 | 1.5 | 4 | 10 | 17.5 | 30 | 6 |
| Example 52 | Par52 | Cel1 | 50 | 1 | 4 | 10 | 17.5 | 30 | 6 |
| Example 53 | Par53 | Cel1 | 65 | 3 | 4 | 10 | 17.5 | 30 | 6 |
| Example 54 | Par54 | Cel1 | 70 | 3 | 4 | 10 | 17.5 | 30 | 6 |
| Example 55 | Par55 | Cel1 | 40 | 3 | 4 | 10 | 17.5 | 30 | 6 |
| Example 56 | Par56 | Cel1 | 35 | 3 | 4 | 10 | 17.5 | 30 | 6 |
| Example 57 | Par57 | Cel1 | 50 | 3 | 4 | 7 | 17.5 | 30 | 6 |
| Example 58 | Par58 | Cel1 | 50 | 3 | 4 | 5 | 17.5 | 30 | 6 |
| Comparative Example 10 | Par61 | Cel1 | 50 | 3 | 4 | 5 | 17.5 | 30 | 6 |
| Comparative Example 11 | Par62 | Cel1 | 50 | 3 | 4 | 5 | 17.5 | 30 | 6 |
| Example 61 | Par63 | Cel1 | 50 | 3 | 4 | 10 | 17.5 | 30 | 6 |
| Example 62 | Par64 | Cel1 | 50 | 3 | 4 | 10 | 17.5 | 30 | 6 |
| Example 63 | Par65 | Cel1 | 50 | 3 | 4 | 10 | 17.5 | 30 | 6 |
| Example 64 | Par66 | Cel1 | 50 | 3 | 4 | 10 | 17.5 | 30 | 6 |
| Example 65 | Par67 | Cel1 | 50 | 3 | 4 | 10 | 17.5 | 30 | 6 |
| Example 66 | Par68 | Cel1 | 50 | 3 | 4 | 10 | 17.5 | 30 | 6 |
| Example 67 | Par69 | Cel1 | 50 | 3 | 4 | 10 | 17.5 | 30 | 6 |
| Example 68 | Par70 | Cel1 | 50 | 3 | 4 | 10 | 17.5 | 30 | 6 |
| Example 69 | Par71 | Cel1 | 50 | 3 | 4 | 10 | 17.5 | 30 | 6 |
| Example 70 | Par72 | Cel1 | 50 | 3 | 4 | 10 | 17.5 | 30 | 6 |
| Example 71 | Par73 | Cel1 | 50 | 3 | 4 | 10 | 17.5 | 30 | 6 |
| Example 72 | Par74 | Cel1 | 50 | 3 | 4 | 10 | 17.5 | 30 | 6 |
| Example 73 | Par75 | Cel1 | 50 | 3 | 4 | 10 | 17.5 | 30 | 6 |
| Example 74 | Par76 | Cel1 | 50 | 3 | 4 | 10 | 17.5 | 30 | 6 |
| Example 75 | Par77 | Cel1 | 50 | 3 | 4 | 10 | 17.5 | 30 | 6 |
| Example 76 | Par78 | Cel1 | 50 | 3 | 4 | 10 | 17.5 | 30 | 6 |
| Example 77 | Par79 | Cel1 | 50 | 3 | 6 | 10 | 17.5 | 30 | 6 |
| Example 78 | Par80 | Cel1 | 50 | 3 | 8 | 10 | 17.5 | 30 | 6 |

TABLE 1-4

|  | | Coating layer formation step | | | | | | Addition step | |
| --- | --- | --- | --- | --- | --- | --- | --- | --- | --- |
|  |  | First-layer compound | | Second-layer compound | | Second-layer compound, polyvalent metal salt | | External additive | |
|  | Particle number | Species | Amount (parts) | Species | Amount (parts) | Species | Amount (parts) | Species | Amount (parts) |
| Example 42 | Par42 | Fir16 | 5 | Sec1 | 4 |  |  | Sur1 | 0.6 |
| Example 43 | Par43 | Fir16 | 5 | Sec1 | 4 |  |  | Sur2 | 0.6 |
| Example 44 | Par44 | Fir16 | 5 | Sec1 | 4 |  |  | Sur3 | 0.6 |
| Example 45 | Par45 | Fir16 | 5 | Sec1 | 4 |  |  | Sur4 | 0.6 |
| Example 47 | Par47 | Fir16 | 5 | Sec1 | 4 |  |  | Sur6 | 0.6 |
| Example 48 | Par48 | Fir16 | 5 | Sec1 | 4 |  |  | Sur7 | 0.6 |
| Example 49 | Par49 | Fir16 | 5 | Sec1 | 4 |  |  | Sur1 | 0.3 |
| Example 50 | Par50 | Fir16 | 5 | Sec1 | 4 |  |  | Sur1 | 0.9 |
| Example 51 | Par51 | Fir16 | 5 | Sec1 | 4 |  |  |  |  |
| Example 52 | Par52 | Fir16 | 5 | Sec1 | 4 |  |  |  |  |
| Example 53 | Par53 | Fir16 | 5 | Sec1 | 4 |  |  |  |  |
| Example 54 | Par54 | Fir16 | 5 | Sec1 | 4 |  |  |  |  |
| Example 55 | Par55 | Fir16 | 5 | Sec1 | 4 |  |  |  |  |
| Example 56 | Par56 | Fir16 | 5 | Sec1 | 4 |  |  |  |  |
| Example 57 | Par57 | Fir16 | 5 | Sec1 | 4 |  |  |  |  |
| Example 58 | Par58 | Fir16 | 5 | Sec1 | 4 |  |  |  |  |
| Comparative Example 10 | Par61 | Fir16 | 5 |  |  |  |  |  |  |
| Comparative Example 11 | Par62 | Fir16 | 5 |  |  |  |  | Sur1 | 0.6 |
| Example 61 | Par63 | Fir16 | 5 | Sec3 | 4 | Sec31 | 0.012 | Sur1 | 0.6 |

TABLE 1-4-continued

| | | Coating layer formation step | | | | | | | |
|---|---|---|---|---|---|---|---|---|---|
| | | First-layer compound | | Second-layer compound | | Second-layer compound, polyvalent metal salt | | Addition step External additive | |
| | Particle number | Species | Amount (parts) | Species | Amount (parts) | Species | Amount (parts) | Species | Amount (parts) |
| Example 62 | Par64 | Fir16 | 5 | Sec3 | 4 | Sec32 | 0.012 | Sur1 | 0.6 |
| Example 63 | Par65 | Fir16 | 5 | Sec3 | 4 | Sec33 | 0.012 | Sur1 | 0.6 |
| Example 64 | Par66 | Fir16 | 5 | Sec3 | 4 | Sec34 | 0.012 | Sur1 | 0.6 |
| Example 65 | Par67 | Fir16 | 5 | Sec16 | 8 | | | | |
| Example 66 | Par68 | Fir16 | 5 | Sec17 | 8 | | | | |
| Example 67 | Par69 | Fir16 | 5 | Sec18 | 8 | | | | |
| Example 68 | Par70 | Fir16 | 5 | Sec19 | 8 | | | | |
| Example 69 | Par71 | Fir16 | 5 | Sec20 | 8 | | | | |
| Example 70 | Par72 | Fir16 | 5 | Sec21 | 8 | | | | |
| Example 71 | Par73 | Fir16 | 5 | Sec22 | 8 | | | | |
| Example 72 | Par74 | Fir16 | 5 | Sec23 | 8 | | | | |
| Example 73 | Par75 | Fir16 | 5 | Sec16 | 6 | | | | |
| Example 74 | Par76 | Fir16 | 5 | Sec16 | 10 | | | | |
| Example 75 | Par77 | Fir16 | 5 | Sec16 | 8 | Sec31 | 0.012 | | |
| Example 76 | Par78 | Fir16 | 5 | Sec16 | 8 | Sec31 | 0.012 | Sur1 | 0.6 |
| Example 77 | Par79 | Fir16 | 5 | Sec1 | 6 | | | Sur1 | 0.6 |
| Example 78 | Par80 | Fir16 | 5 | Sec1 | 6 | | | Sur1 | 0.6 |

TABLE 1-5

| | | Particle construction | | | |
|---|---|---|---|---|---|
| | Product name | Core-particle compound | First-layer coating material | Second-layer coating material | Uppermost-surface additive |
| Par101 | CELLULOBEADS D-10 | Cellulose | None | None | None |
| Par102 | OTS-0.5A CELLULOBEADS D-10 | Cellulose | Triethoxyoctylsilane | None | None |
| Par103 | S-STM CELLULOBEADS D-5 | Cellulose | Magnesium stearate | None | None |
| Par104 | CELLUFLOW C25 | Cellulose | None | None | None |
| Par105 | CELLUFLOW TA25 CELLULOBEADS D-10 | Diacetyl cellulose | None | None | None |
| Par111 | Example 1, Japanese Patent No. 6921923 | Cellulose | Zinc stearate | None | None |
| Par112 | Example 2, Japanese Patent No. 6921923 | Cellulose | Magnesium stearate | None | None |
| Par113 | Example 1, Japanese Unexamined Patent Application Publication No. 2021-021044 | Cellulose | None | None | None |
| Par114 | Example 1, Japanese Unexamined Patent Application Publication No. 2021-021045 | Cellulose | None | None | None |

TABLE 2-1

| | | Particle characteristics | | | | | Flexibility, Young's modulus (MPa) Good if lower than 80 MPa |
|---|---|---|---|---|---|---|---|
| | Resin particles | Particle diameter (μm) | GSDv (—) | Sphericity (—) | Mn (—) | Surface smoothness (%) | Biodegradation, 28 days (%) Good if 60% or higher | |
| Example 1 | Par1 | 8 | 1.11 | 0.98 | 47000 | 89 | 76 | 45 |
| Example 2 | Par2 | 7 | 1.35 | 0.99 | 58000 | 89 | 76 | 47 |
| Example 3 | Par3 | 7 | 1.38 | 0.97 | 75000 | 92 | 72 | 56 |
| Example 4 | Par4 | 8 | 1.33 | 0.98 | 50000 | 91 | 72 | 55 |
| Example 5 | Par5 | 6 | 1.32 | 0.96 | 35000 | 93 | 65 | 78 |
| Example 6 | Par6 | 7 | 1.41 | 0.98 | 25000 | 94 | 65 | 75 |
| Example 7 | Par7 | 7 | 1.45 | 0.96 | 15000 | 93 | 70 | 76 |
| Example 8 | Par8 | 8 | 1.12 | 0.98 | 47000 | 89 | 73 | 48 |
| Example 9 | Par9 | 8 | 1.32 | 0.95 | 46000 | 89 | 73 | 47 |
| Example 10 | Par10 | 7 | 1.35 | 0.98 | 48000 | 88 | 74 | 48 |
| Example 11 | Par11 | 7 | 1.35 | 0.97 | 47000 | 89 | 73 | 48 |
| Example 12 | Par12 | 6 | 1.38 | 0.98 | 47000 | 90 | 74 | 47 |
| Example 13 | Par13 | 5 | 1.35 | 0.99 | 47000 | 89 | 73 | 47 |
| Example 14 | Par14 | 8 | 1.44 | 0.99 | 45000 | 93 | 76 | 45 |
| Example 15 | Par15 | 7 | 1.43 | 0.96 | 44000 | 88 | 70 | 53 |
| Example 16 | Par16 | 5 | 1.42 | 0.98 | 47000 | 88 | 69 | 56 |
| Example 17 | Par17 | 8 | 1.35 | 0.98 | 48000 | 87 | 68 | 58 |
| Example 18 | Par18 | 6 | 1.35 | 0.98 | 47000 | 89 | 70 | 56 |
| Example 19 | Par19 | 7 | 1.38 | 0.97 | 47000 | 89 | 71 | 55 |
| Example 20 | Par20 | 7 | 1.29 | 0.98 | 46000 | 90 | 71 | 58 |
| Example 21 | Par21 | 7 | 1.35 | 0.98 | 47000 | 89 | 70 | 54 |
| Example 22 | Par22 | 6 | 1.38 | 0.97 | 47000 | 95 | 76 | 48 |
| Example 23 | Par23 | 7 | 1.35 | 0.98 | 45000 | 86 | 65 | 77 |
| Example 24 | Par24 | 8 | 1.35 | 0.99 | 45000 | 85 | 65 | 76 |
| Example 25 | Par25 | 7 | 1.39 | 0.98 | 47000 | 88 | 76 | 42 |
| Example 26 | Par26 | 7 | 1.41 | 0.96 | 47000 | 87 | 73 | 48 |
| Example 27 | Par27 | 8 | 1.45 | 0.98 | 48000 | 87 | 74 | 47 |
| Example 28 | Par28 | 7 | 1.28 | 0.98 | 47000 | 88 | 74 | 46 |
| Example 29 | Par29 | 8 | 1.31 | 0.96 | 47000 | 87 | 73 | 45 |
| Example 30 | Par30 | 7 | 1.31 | 0.98 | 46000 | 85 | 73 | 47 |
| Example 31 | Par31 | 6 | 1.35 | 0.96 | 43000 | 85 | 67 | 57 |
| Example 32 | Par32 | 7 | 1.35 | 0.98 | 47000 | 83 | 67 | 58 |
| Example 33 | Par33 | 8 | 1.28 | 0.98 | 47000 | 85 | 68 | 55 |
| Example 34 | Par34 | 8 | 1.35 | 0.98 | 45000 | 80 | 67 | 58 |
| Example 35 | Par35 | 7 | 1.35 | 0.97 | 47000 | 83 | 67 | 56 |
| Example 36 | Par36 | 6 | 1.35 | 0.98 | 47000 | 81 | 66 | 59 |
| Example 37 | Par37 | 7 | 1.33 | 0.96 | 47000 | 82 | 67 | 54 |
| Example 38 | Par38 | 8 | 1.45 | 0.98 | 46000 | 83 | 60 | 75 |
| Example 39 | Par39 | 7 | 1.46 | 0.99 | 47000 | 84 | 72 | 42 |
| Example 40 | Par40 | 7 | 1.51 | 0.98 | 48000 | 80 | 74 | 45 |
| Example 41 | Par41 | 8 | 1.35 | 0.96 | 47000 | 78 | 70 | 51 |

TABLE 2-2

| | | Particle characteristics | | | | | Biodegradation, 28 days (%) Good if 60% or higher | Flexibility, Young's modulus (MPa) Good if lower than 80 MPa |
|---|---|---|---|---|---|---|---|---|
| | Resin particles | Particle diameter (μm) | GSDv (—) | Sphericity (—) | Mn (—) | Surface smoothness (%) | | |
| Example 42 | Par42 | 6 | 1.12 | 0.98 | 47000 | 80 | 75 | 38 |
| Example 43 | Par43 | 8 | 1.35 | 0.99 | 44000 | 80 | 75 | 38 |
| Example 44 | Par44 | 7 | 1.33 | 0.96 | 45000 | 80 | 72 | 42 |
| Example 45 | Par45 | 8 | 1.37 | 0.96 | 47000 | 81 | 72 | 43 |
| Example 47 | Par47 | 7 | 1.22 | 0.98 | 45000 | 82 | 70 | 45 |
| Example 48 | Par48 | 8 | 1.35 | 0.98 | 47000 | 81 | 70 | 45 |
| Example 49 | Par49 | 7 | 1.21 | 0.97 | 47000 | 81 | 74 | 41 |
| Example 50 | Par50 | 8 | 1.33 | 0.98 | 46000 | 80 | 71 | 41 |
| Example 51 | Par51 | 7 | 1.68 | 0.98 | 47000 | 83 | 76 | 42 |
| Example 52 | Par52 | 8 | 1.75 | 0.97 | 48000 | 88 | 74 | 50 |
| Example 53 | Par53 | 3 | 1.29 | 0.98 | 47000 | 87 | 76 | 42 |
| Example 54 | Par54 | 2 | 1.33 | 0.98 | 47000 | 88 | 74 | 50 |
| Example 55 | Par55 | 9 | 1.34 | 0.97 | 47000 | 89 | 76 | 42 |
| Example 56 | Par56 | 11 | 1.29 | 0.98 | 47000 | 90 | 71 | 48 |
| Example 57 | Par57 | 8 | 1.33 | 0.91 | 45000 | 88 | 76 | 42 |
| Example 58 | Par58 | 7 | 1.35 | 0.85 | 47000 | 87 | 72 | 52 |
| Example 61 | Par63 | 8 | 1.33 | 0.98 | 46000 | 83 | 75 | 35 |

TABLE 2-2-continued

|  | Resin particles | Particle characteristics | | | | | Biodegradation, 28 days (%) Good if 60% or higher | Flexibility, Young's modulus (MPa) Good if lower than 80 MPa |
|---|---|---|---|---|---|---|---|---|
|  |  | Particle diameter (μm) | GSDv (—) | Sphericity (—) | Mn (—) | Surface smoothness (%) | | |
| Example 62 | Par64 | 7 | 1.38 | 0.98 | 47000 | 83 | 75 | 34 |
| Example 63 | Par65 | 8 | 1.38 | 0.98 | 46000 | 83 | 75 | 34 |
| Example 64 | Par66 | 7 | 1.39 | 0.98 | 46000 | 84 | 75 | 35 |
| Example 65 | Par67 | 7 | 1.19 | 0.97 | 46000 | 96 | 80 | 38 |
| Example 66 | Par68 | 6 | 1.28 | 0.96 | 45000 | 92 | 78 | 40 |
| Example 67 | Par69 | 8 | 1.27 | 0.97 | 45000 | 93 | 78 | 39 |
| Example 68 | Par70 | 6 | 1.33 | 0.95 | 46000 | 87 | 80 | 51 |
| Example 69 | Par71 | 7 | 1.35 | 0.93 | 45000 | 86 | 72 | 39 |
| Example 70 | Par72 | 7 | 1.29 | 0.97 | 45000 | 89 | 80 | 36 |
| Example 71 | Par73 | 6 | 1.3 | 0.94 | 46000 | 92 | 78 | 37 |
| Example 72 | Par74 | 8 | 1.39 | 0.93 | 45000 | 83 | 76 | 45 |
| Example 73 | Par75 | 7 | 1.19 | 0.95 | 46000 | 95 | 80 | 38 |
| Example 74 | Par76 | 6 | 1.21 | 0.96 | 45000 | 95 | 80 | 38 |
| Example 75 | Par77 | 8 | 1.17 | 0.95 | 46000 | 96 | 81 | 35 |
| Example 76 | Par78 | 7 | 1.44 | 0.9 | 45000 | 83 | 81 | 33 |
| Example 77 | Par79 | 7 | 1.44 | 0.94 | 46000 | 82 | 73 | 48 |
| Example 78 | Par80 | 8 | 1.47 | 0.91 | 46000 | 78 | 64 | 51 |

TABLE 2-3

|  | Resin particles | Particle characteristics | | | | | Biodegradation, 28 days (%) Good if 60% or higher | Flexibility, Young's modulus (MPa) Good if lower than 80 MPa |
|---|---|---|---|---|---|---|---|---|
|  |  | Particle diameter (μm) | GSDv (—) | Sphericity (—) | Mn (—) | Surface smoothness (%) | | |
| Comparative Example 1 | Par101 | 14 | 1.17 | 0.97 | 110000 | 98 | 68 | 125 |
| Comparative Example 2 | Par102 | 14 | 1.32 | 0.98 | 110000 | 90 | 8 | 138 |
| Comparative Example 3 | Par103 | 12 | 1.47 | 0.55 | 110000 | 45 | 9 | 127 |
| Comparative Example 4 | Par104 | 10 | 1.86 | 0.97 | 45000 | 90 | 68 | 110 |
| Comparative Example 5 | Par105 | 12 | 1.94 | 0.98 | 48000 | 78 | 17 | 55 |
| Comparative Example 6 | Par111 | 9 | 1.55 | 0.96 | 33000 | 82 | 66 | 118 |
| Comparative Example 7 | Par112 | 9 | 1.62 | 0.96 | 33000 | 79 | 67 | 113 |
| Comparative Example 8 | Par113 | 4 | 1.87 | 0.95 | 44000 | 90 | 68 | 113 |
| Comparative Example 9 | Par114 | 8.2 | 1.88 | 0.96 | 45000 | 90 | 66 | 112 |
| Comparative Example 10 | Par61 | 8 | 1.4 | 0.97 | 46000 | 95 | 44 | 57 |
| Comparative Example 11 | Par62 | 7 | 1.42 | 0.97 | 45000 | 89 | 35 | 56 |

These results indicate that the cellulosic particles according to the Examples may combine high biodegradability with high flexibility compared with the cellulosic particles according to the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A cellulosic particle comprising:
   a cellulose-based core particle;
   a first coating layer covering the core particle and containing a polyamine compound; and a second coating layer covering the first coating layer and containing at least one selected from the group consisting of a carnauba wax, a linear-chain saturated fatty acid with 14 or more and 22 or fewer carbon atoms, and a hydroxy fatty acid.

2. The cellulosic particle according to claim 1, wherein the polyamine compound is at least one selected from the group consisting of polyethyleneimine and polylysine.

3. The cellulosic particle according to claim 2, wherein the second coating layer further contains a polyvalent metal salt.

4. The cellulosic particle according to claim 2, further comprising at least one external additive selected from the group consisting of a silicon-containing compound particle and a metallic soap particle.

5. The cellulosic particle according to claim 1, wherein the second coating layer contains at least one selected from the group consisting of a linear-chain saturated fatty acid with 14 or more and 22 or fewer carbon atoms, and a hydroxy fatty acid.

6. The cellulosic particle according to claim 1, wherein the second coating layer further contains a polyvalent metal salt.

7. The cellulosic particle according to claim 1, further comprising at least one external additive selected from the group consisting of a silicon-containing compound particle and a metallic soap particle.

8. The cellulosic particle according to claim 7, comprising a silica particle as the silicon-containing compound particle.

9. The cellulosic particle according to claim 1, wherein a volume-average particle diameter of the cellulosic particles is 3 μm or more and less than 10 μm.

10. The cellulosic particle according to claim 1, wherein an upper geometric standard deviation by number GSDv of the cellulosic particles is 1.0 or greater and 1.7 or less.

11. The cellulosic particle according to claim 1, wherein sphericity of the cellulosic particle is 0.9 or greater.

12. The cellulosic particle according to claim 1, wherein a number-average molecular weight of the cellulose is 37000 or more.

13. The cellulosic particle according to claim 12, wherein the number-average molecular weight of the cellulose is 45000 or more.

14. The cellulosic particle according to claim 1, wherein surface smoothness of the cellulosic particle is 80% or higher.

* * * * *